United States Patent [19]

Berrebi

[11] Patent Number: 5,068,477

[45] Date of Patent: Nov. 26, 1991

[54] PROCESS FOR REDUCING A REFINING CATALYST AND USE OF THE CATALYST IN HYDROGENATION

[75] Inventor: Georges Berrebi, Bourg Les Valence, France

[73] Assignee: Europeenne de Retraitement de Catalyseurs Eurecat, La Voulte Sur Rhone, France

[21] Appl. No.: 692,756

[22] Filed: Apr. 29, 1991

Related U.S. Application Data

[60] Division of Ser. No. 479,680, Feb. 14, 1990, Pat. No. 5,032,565, which is a continuation-in-part of Ser. No. 356,723, May 25, 1989, abandoned, which is a continuation of Ser. No. 169,260, Mar. 17, 1988, abandoned.

[30] Foreign Application Priority Data

Aug. 14, 1987 [FR] France ................................ 87 11633

[51] Int. Cl.$^5$ .......................... C07C 5/03; C07C 5/08
[52] U.S. Cl. .................................... 585/274; 208/124; 502/28; 502/33; 502/328; 502/335; 502/339
[58] Field of Search ................ 502/28, , 33, 328, 335, 502/337, 339, 344, 347; 585/274; 208/124

[56] References Cited

U.S. PATENT DOCUMENTS

| | | | |
|---|---|---|---|
| 2,833,725 | 5/1958 | Owen et al. | 502/30 |
| 3,699,054 | 10/1972 | Organ | 502/33 |
| 4,234,462 | 11/1980 | Bondar et al. | 502/307 |
| 4,478,948 | 10/1984 | Rubsdat | 502/33 |

FOREIGN PATENT DOCUMENTS

| | | | |
|---|---|---|---|
| 2657171 | 12/1976 | Fed. Rep. of Germany | 502/33 |
| 232504 | 2/1986 | German Democratic Rep. | 502/33 |
| 199838 | 7/1967 | U.S.S.R. | 502/33 |

*Primary Examiner*—Asok Pal
*Attorney, Agent, or Firm*—Millen, White & Zelano

[57] ABSTRACT

This invention concerns a process for reducing a refining catalyst before it is put into use, the catalyst containing a support and an active phase based on at least one noble or non-noble metal of group VIII or of group Ib of the periodic classification of elements, consisting of:
(a) impregnating the catalyst with an aqueous or organic solution of a reducing agent,
(b) decomposing the reducing agent by heating with a catalyst, and
(c) drying the catalyst thus obtained.

The catalyst is used in selective hydrogention of a feed such as olefin, acetylenes, diolefins etc.

22 Claims, No Drawings

PROCESS FOR REDUCING A REFINING CATALYST AND USE OF THE CATALYST IN HYDROGENATION

CROSS REFERENCE TO RELATED APPLICATIONS

This application is a divisional of application Ser. No. 07/479,680, filed Feb. 14, 1990, now U.S. Pat. No. 5,032,565, which is a continuation-in-part of application Ser. No. 07/356,723, filed May 25, 1989, now abandoned, which is a continuation of application Ser. No. 07/169,260, filed Mar. 17, 1988 now abandoned.

This invention concerns the pretreatment of refining catalysts that may be in the fresh state or may be provided by a regenerating, activating or reactivating unit.

Certain refining catalysts must generally be presulfurized and possibly reduced in the presence of hydrogen before they can be used or re-used in hydrocarbon conversion reactions, i.e. before being put into contact with the hydrocarbons or the charge of hydrocarbons to be treated. This is particularly the case with hydrodsulfurization catalysts.

Other catalysts must be solely reduced with hydrogen before being used or re-used in hydrocarbon conversion reactions, i.e., before being put in contact with the hydrocarbons or the hydrocarbon charge to be treated. This is the case particularly with hydrogenation catalysts of olefin cuts during production by cracking in the vaporized state. Such catalysts need not usually be presulfurized, sulfur being rather more of a poison for this type of catalyst.

The invention concerns a particular method for reducing the second type of catalysts which usually comprise a support and an active phase based on at least one metal of group VIII of the periodic classification of elements, this metal being either a noble metal of the platinum family (platinum, palladium, ruthenium, iridium, rhodium and osmium) or a non-noble metal of group VIII, i.e., iron, cobalt or nickel, and/or based on at least one metal of group Ib, i.e., copper, silver or gold.

In the prior art, certain reductions are carried out in the presence of hydrogen at a temperature between 50° and 500° C. according to the use contemplated for the catalyst and depending on the nature of the catalyst used. For nickel, cobalt or iron catalysts, these reductions are carried out around 400° C.; for catalysts of palladium or other noble metals of the plantinum family, these reductions are carried out around 100° C.

Those reductions that are necessary for optimum use of the hydrogenation catalysts are also troublesome for the refiner. They in fact necessitate the consumption of a substantial quantity of hydrogen by the refiner; these reactions take time, because they last several hours, and they also necessitate a substantial cooling period for the catalyst since the hydrogenation reactions are carried out at 20° to 50° C. These problems have existed for some decades but no solution has hitherto been found apart from those consisting of using reactors arranged in parallel, certain of the reactors being used in turn for hydrogenation of the charge and reduction of the catalyst, and others being used in turn for reduction of the catalyst and for hydrogenation of the charge, with, therefore, alternate periods of suspending use of the catalyst reduction reactors, cooling of the catalyst and catalytic hydrogenation of the charge.

It is to be noted on the contrary that the type of problems encountered here for reduction of hydrogenation catalysts do not arise in the reduction of catalysts, for example, for catalytic re-forming; in fact re-forming catalysts must be reduced at 400° to 500° C., a temperature which is of the order of the temperatures of reactions suitable for re-forming. It is therefore sufficient to place the catalyst in the re-forming reactor, to inject hydrogen under operating conditions for re-forming in order to activate the catalyst, and then to inject the hydrocarbon charge to be treated. Nevertheless, there is nothing prevent the refiner from using the procedure in accordance with the invention, if he believes it useful for various possible reasons.

The present invention permits of remedying the foregoing disadvantages and of carrying out a convenient reduction of hydrogenation catalysts. The procedure of the invention comprises effecting in the reduction of the catalyst (which may be outside the refining reactor, i.e., ex-situ, or in the refining reactor, i.e., in-situ) in three steps:

(a) The catalyst is impregnated at between 0° and 50° C., preferably 0° and 40° C. and more particularly 10° and 30° C. or at ambient temperature, with an aqueous or organic solution of a compound that is a reducing agent chosen from the group consisting of aldehydes containing 2 to 14 (preferably 3 to 12) carbon atoms in the molecule, ketones or polyketones containing 3 to 18 (preferably 3 to 12) carbon atoms in the molecule, ethers containing 2 to 14 (preferably 3 to 12) carbon atoms in the molecule, alcohols or polyalcohols containing 1 to 14 (preferably 2 to 12) carbon atoms in the molecule and organic acids or polyacids containing 1 to 14 (preferably 1 to 12) carbon atoms in the molecule, by introducing 10 ppm to 100% by weight, preferably 10 ppm to 50%, particularly 1000 ppm to 10%, of this compound on the catalyst.

(b) The temperature of the thus-impregnated catalyst is increased to a temperature between 100° and 150° C. and under a pressure of 1 to 10 bars (preferably 1.2 to 5 bars and particularly 2 to 4 bars, e.g. 3.5 bars), so as to cause cracking or decomposition of the reducing agent. This cracking or decomposition is indicated by the formation, essentially, of carbon monoxide which causes the reduction of the catalyst and the suitable distribution of the active phase over the catalyst. This cracking or decomposition also causes formation of water vapor.

(c) The catalyst is dried to eliminate the impregnating solvent and the water formed in step (b).

The impregnating solvent is usually water or any suitable organic solvent in which the reducing agent, when different from the chosen solvent, is soluble. One can mention alcohols, ethers, etc.

Below are mentioned several examples of reducing agents.

As aldehydes, there may be mentioned by way of example, ethanal, propanal, butanal, 2-ethylbutanal, 2-phenoxypropanal, 3-methylbutanal, 2-methylpentanal, 2-ethylhexanal, heptanal, octanal, nonanal, decanal, dodecanal, dimethylacetaldodecanal, etc.

As ketones there may be mentioned as examples, acetone, 2-butanone, 3-methyl-2-butanone, 2-pentanone, 3-pentanone, 2-hexanone, 3,3-dimethyl-2-hexanone, 3,4-dimethyl-2-hexanone, 3-hexanone, 3,4-dimethyl-3-hexanone, 2,5-dimethyl-3-hexanone, 4,4-dimethyl-3-hexanone, 3-methyl-2-hexanone, 4-methyl- 2-hexanone, 5-methyl-2-hexanone, 4-methyl-3-hexanone, 5-methyl-3-hexanone, 1-phenyl-1-hexanone, 2-heptanone, 3-heptanone, 4-heptanone, 2,6-dimethyl-4-heptanone, isopropyl-2-heptanone, 3-methyl-2-heptanone, 3-methyl-2-heptanone, 6-methyl-3-heptanone, 2-methyl-4-heptanone, 1-phenyl-1-heptanone, 2-octanone, 3-octanone, 4-octanone, 7-methyl-4-octanone, 2-nonanone, 4-nonanone, 5-nonanone, 2-decanone, 3-decanone, 4-decanone, 2-dodecanone, 1-phenyl-1-dodecanone.

It is possible to use unsaturated aldehydes or ketones. There may be mentioned as example 2-butenal, 2-hexenal-2, pent-3-en-2-one, 5,5-dimethyl-1-phenylpent-1-en-3-one, hept-3-en-2-one, 6-methylhept-5-en-2-one.

As polyketones, there can for example be used butane-2,3-dione (dimethylglyoxal), pentane-2,3-dione, pentane-2,4-dione(acetylacetone), 3,3-dimethyl pentane-2,4-dione, 3-ethylpentane-2,4-dione, hexane-2,5-dione, 1,6-diphenylhexane-1,6-dione, 2,2,5,5-tetramethylhexane-3,4-dione, heptane-2,4-dione, heptane-2,4,6-trione, octane-2,3-dione, octane-2,7-dione, octane-3,6-dione, octane-4,5-dione, 2,2,7,7-tetramethyloctane-3,6-dione, 1,4-diphenylbut-2-ene-1,4-dione(ethylenic diketone), etc.

As ethers, there may be mentioned as examples: dimethyl ether, diethyl ether, methyl ethyl ether, methyl butyl ether, methyl t-butyl ether, methyl-2-ethylhexyl ether, ethyl butyl ether, ethyl t-butyl ether, di-n-propyl ether, isoamylether, furan, tetrahydrofuran, dioxan, etc.

As alcohols, the following examples may be mentioned: methanol, ethanol, propanol, n-butanol, isobutanol, 1-pentanol, 2-pentanol, 2-methyl-4-butanol, 2-methyl-3-butanol, hexanols, methyl-pentanols, dimethylbutanols, heptanols, octanols and amyl alcohols $C_5H_{11}OH$.

As acids there may be mentioned as examples those that correspond to the aldehydes, ketones and/or alcohols named above. Specific acids that may be mentioned are lactic acid, citric acid, formic acid, and propionic acid.

Preferably the procedure of the present invention is carried out ex-situ. The catalyst reduced by methods presenting no danger (handling of hydrogen is avoided) is then furnished to the refiner completely ready for use, thus freeing the refiner from delicate and essential operations that have been explained above. It is thus possible that a refiner can sub-contract the operation of reducing the catalysts, the same possibly applying to catalytic re-forming catalysts if it is thought useful.

The reduction of the catalyst in accordance with the invention can be carried out in any suitable apparatus, in particular in a furnace. According to a prudent technique, the temperature adequate for cracking or decomposing the reducing agent is obtained by circulation through a bed of catalyst situated in an enclosure (for example in a furnace or in a reactor) by a current of dry steam, or using any other fluid such as nitrogen or another inert gas (argon, helium) or a mixture of such a fluid and water vapor. A different form of the apparatus involves disposing in the enclosure containing the catalytic bed a series of hollow tubes through which a fluid (for example steam and/or warm water) passes by means of which the cracking or decomposition temperature of the reducing agent impregnated on the catalyst is obtained and controlled, this temperature being advantageously a function of the pressure that exists in the reactor. The reactor in which the reduction of the catalyst is obtained can be, for example, a rotary furnace arranged in such a manner that during rotation the catalyst particles are brought regularly into contact with the heating tubes.

It may be indicated again that the catalysts used in the process are chosen from the metals of group VIII of the periodic classification of elements, such as for example, nickel, cobalt, platinum or palladium, or from among the metals of group Ib, such as, for example, copper, silver and gold.

Often nickel or palladium is preferred for use. These catalysts can be deposited on inert supports and be of sufficiently low acidity in certain cases to permit of good selective hydrogenation. In this case, among the supports, inert alumina can be chosen so that it is possible to obtain a finished catalyst containing a catalytic element on a support and advantageously having a surface of 1 to 100 $m^2/g$ and preferably between 50 and 100 $m^2/g$ and a total porous volume between 0.3 and 1 $cm^3/g$. The surface acidity of this catalyst, measured by absorption of ammonia at 320° C. under a pressure of 300 mm of that gas, is characterized by the fact that the heat given off by that absorption is preferably less than 4 calories/g of catalyst, which subsequently avoids, during use of the catalyst, parasitic polymerisations and subsequent fouling of the catalyst. Among the other supports may be chosen silica, which is particularly neutral; the catalyst surface can then be between 1 and 300 $m^2/g$.

Palladium catalysts can usually contain 0.01 to 1% by weight of the metal. Nickel catalysts usually contain from 1 to 20% by weight of the metal.

The catalysts can be used in the form of balls, crushed materials, pellets or extrudates of which the mean dimension of the grains can be between 1 and 6 mm preferably between 2.5 and 4 mm in order to present good mechanical resistance.

The catalysts can be used in the fixed-bed technique; the catalytic bed can have, by way of illustration and indication, depending on the nature of the charges to be treated and the content of impurities to be eliminated, a relation of height to diameter between 1 and 8 and preferably between 2 and 5. Different catalysts can be used in different reaction zones.

For example, in a first reaction zone the catalyst used e.g. palladium on alumina, can advantageously have a palladium content between 0.2 and 0.8 weight % and a catalyst used in a second reaction zone when it consists of palladium on aluminium can usually contain 0.05 to 0.4 and preferably 0.1 to 0.3 weight % of palladium.

The catalysts of the type described above can be used for example to selectively hydrogenate unsaturated hydrocarbons, particularly those containing 3 to 10 carbon atoms in the molecule. Here, the catalysts advantageously contain nickel or noble metals such as palladium. This type of procedure is described in U.S. Pat. No. 3,674,888. The catalyst is preferably based on palladium or on a compound of palladium deposited on alumina.

As an example, the proportion of palladium compound expressed as palladium is here usually between 0.1 and 3 g per 100 g of alumina.

Other metals can be present as additives.

The selective hydrogenation treatment can preferably be affected at a temperature of 0° to 80° C. under a pressure sufficient to maintain the liquid phase, usually between 1 and 25 $kg/cm^2$. The molar relation hydrogen/(unsaturated hydrocarbon) is usually between 1 and 5 (preferably between 1 and 2). The hourly flow of charge is advantageously between 2 and 50 (preferably between 10 and 25) volumes per liquid per volume of catalyst.

It is possible to operate with a fixed bed of catalyst, the reactants circulating from bottom to top and from top to bottom.

Such a process allows, for example, the hydrogenation of acetylenic and/or diolefinic hydrocarbons without appreciable hydrogenation of monoethylenic hydrocarbons. It also allows hydrogenation of acetylenic hydrocarbons and 1,2-butadiene without a substantial hydrogenation of 1,3-butadiene.

U.S. Pat. No. 4,347,392 also describes refining operations that make use of catalysts that can be treated in accordance with the invention. Thus, more specifically, concerning refining operations making use of such catalysts, it may be recalled that these operations aim at selective hydrogenation of impurities in an ethylene and/or propylene cut.

Processes for high-temperature conversion of hydrocarbons, such as for example steam-cracking, produce unsaturated hydrocarbons, such as for example, ethylene, propylene, butadiene and butenes as well as hydrocarbons boiling in the range of oils; mono-olefinic gaseous hydrocarbons with two or three carbon atoms obtained by this procedure also contain a certain quantity of hydrocarbons of a greater degree of unsaturation. The content of these hydrocarbons depends on the severity of the conversion treatment but is always too small for them to be separated and used as such in petrochemistry. However, their presence in association with mono-olefinic hydrocarbons makes difficult if not impossible the use of the latter in petrochemistry. That is the case for the ethylenic or propylenic cut, from which it is necessary also to remove as completely as impossible, respectively, acetylene or propyne and propadiene.

In order to obtain pure propylene, known procedures also involve hydrogenating, as selectively as possible, propyne and propadiene from the $C_3$ cut. A typical charge provided by steam-cracking contains by weight 2 to 5% propane, 90 to 95% propylene, 2 to 3% propyne and 1 to 2% propadiene.

The purity of propylene required by subsequent petrochemical use corresponds normally to less than 10 parts per million of the total propyne plus propadiene. Moreover, it is desirable that the propylene yield be at least equal to 100% and usually better than that value inasmuch as propyne and propadiene are selectively hydrogenated to propylene.

Here, a selective hydrogenation catalyst must have two essential qualities: a large selectivity in a manner to selectively hydrogenate acetylenic, allenic and diolefinic impurities, all of which avoids the parasitic reactions of mono-olefin hydrogenation and of polymerisation, which provoke not only a decrease in yield but also deactivation of the catalyst.

The most generally used catalysts at present are, as indicated above, constituted by palladium deposited on an alumina or silica support.

However, with conventional catalysts, yields of oligomer of 0.3 to 1 weight % are obtained in the product following hydrogenation. In U.S. Pat. No. 4,347,392, the use of catalysts that do not have these disadvantages has been proposed, the yield of oligomer formed remaining most often less than 0.2 weight % in the product.

Selective hydrogenation can be conducted to about 0° to 160° C. It is possible to operate in gaseous or liquid phase. In the latter case, applicable particularly to a $C_3$ cut, the pressure must be sufficient to maintain a liquid phase and operation is preferably at 0° to 80° C. under 10 to 40 bars at a liquid flow of 2 to 50, preferably 10 to 30, volumes per volume of catalyst per hour. In the gaseous phase, the flow of a $C_2$ and/or $C_3$ cut (VVH gas) is for example 500 to 20,000 volumes per volume of catalyst per hour and the pressure, for example, is 5 to 30 bars.

The catalysts treated in accordance with the invention are equally suitable in selective hydrogenation of essential oils containing at the same time gum-generating compounds and undesirable sulphur compounds, in particular thiols and/or hydrogen sulphide as is explained in U.S. Pat. Nos. 4,208,271 and 3,770,619.

In U.S. Pat. No. 4,208,271 a procedure is proposed that involves hydrogenating oil by means of gaseous hydrogen on two separate catalyst beds. The oil and the hydrogen first pass over a catalyst comprising metallic palladium on a support and then over a catalyst comprising metallic nickel on a support under operating conditions that are conventional for the selective hydrogenation of oils, i.e. conditions ensuring elimination at least in part of thiols and/or hydrogen sulphide and at least partial hydrogenation of gum-generating compounds (which manifest themselves by a lowering of the maleic anhydride index or MAV) without excessive hydrogenation of mono-olefins.

The conventional conditions are well known. They include in particular the following conditions, given by way of non-limiting example:

temperature: 30° to 250° C., preferably 50° to 200° C.;
total pressure: 10 to 100 bars, preferably 20 to 50 bars;
spatial velocity or relation of volume of liquid charge (oil) to volume of catalyst per hour (VVH) 0.5 to 10, preferably 2 to 5;
molar relation of hydrogen to charge (oil): 0.1 to 2, preferably 0.5 to 1.5.

It is preferred to operate with fixed beds of catalyst, which can be arranged one behind the other or one above the other, in the same reactor or in two or more separate reactors.

The first catalyst advantageously contains 0.05 to 5 weight % of palladium, preferably 0.1 to 0.5%.

The second catalyst may contain 2 to 50 weight % of nickel, preferably 5 to 20%.

By the use of metallic palladium or nickel is meant that initially one uses palladium or nickel in a reduced state, excluding the same metals entirely in the state of oxides or sulfides. During the operation, the exact state of the catalyst is not well known; it could more particularly produce limited sulfurization or a slight adsorption of sulphur. Numerous studies have been devoted to these phenomena and there is no point in setting them out here.

The preferred catalyst supports are the said neutral supports, i.e. those that have only slight acidity or none at all, the said acidity being measurable for example by the ammonia adsorption test (Journal of Catalysis, 2, 211–222, 1963).

In U.S. Pat. No. 3,770,619 an analogous procedure is proposed that is suitable for purification of oils from pyrolysis consisting essentially of hydrocarbons having 5 to 10 carbon atoms in the molecule and that is used for selective hydrogenation of olefins and alkenyl-aromatics and possibly for more exhaustive hydrogenation of a charge and likewise including a partial olefin hydrogenation.

In the procedure as applied to oils from pyrolysis and operating with at least two reaction zones, the higher temperatures of operation, which are little different in each of the two reaction zones, will be between 20° and 180° C. and advantageously between 60° and 120° C. The pressures applied in the first reaction zone are between 5 and 50 and preferably between 15 and 35 bars, in the second reaction zone the pressures are between 30 and 80 and preferably between 35 and 60 bars.

The temperatures given above depend on the charge submitted to hydrogenation, in particular the sulfur content of that charge, and the carbon monoxide content of the hydrogenating gas. The relationship m, the quantity of hydrogen introduced compared to the theoretical quantity necessary to hydrogenate the undesirable compounds, is usually between 1 and 10 and preferably between 2 and 7 for the first reaction zone, and between 2 and 12, preferably 4 and 10, for the second zone. The spatial flow rate (VVH) expressed in liters of charge to be hydrogenated per liter of catalyst per hour varies between 5 and 50 and preferably between 5 and 20.

EXAMPLE 1

In a first test, operation is as in U.S. Pat. No. 3,674,888. Agglomerates of alumina are prepared in the following manner: damp alumina is agglomerated in a pill-making machine to transform it into balls 2 to 6 mm in diameter. These balls are treated with water at 190° C. for six hours, then they are calcined at 800° C. for four hours. The balls are impregnated with an aqueous solution containing 5% of palladium nitrate in a quantity sufficient to deposit 1% by weight of palladium with respect to the dry alumina.

Drying, and calcination at 450° C. over two hours in accordance with conventional techniques, are carried out and the catalyst is then reduced by a current of hydrogen at 100° C. for two hours. A catalyst A is obtained.

The catalyst obtained has the following characteristics:

|  | Surface (m$^2$/g) | Porous Volume (cm$^3$/g) |
|---|---|---|
| catalyst A | 60 | 0.58 |

In a second test, a catalyst is prepared as in the first test. The only difference is that the catalyst is not reduced by using hydrogen at 100° C. but by using an aqueous solution of formic acid: the catalyst is impregnated with the solution at 20° C. under atmospheric pressure in a manner such that it contains 2% by weight of formic acid. Then the temperature of the catalyst is raised to 120° C. under a pressure of 3 bars and is maintained for two hours under these operating conditions. Then the catalyst is dried. A catalyst A1, which has the same characteristics as catalyst A, is obtained.

These two catalysts A and A1 are used to hydrogenate a C$_4$ cut at 15° C. under a total pressure of 15 kg/cm$^2$, with a molar relationship H$_2$/impurities of 3 and an hourly flow of 25 volumes of liquid per volume of catalyst.

The C$_4$ cut contains 5% of saturated hydrocarbons, 5% of mono-olefinic hydrocarbons, 43.5% of 1,3-butadiene and 0.5% of acetylenic hydrocarbons (methylacetylene, ethylacetylene and vinylacetylene). The relative percentages following hydrogenation are obtained as follows:

|  | Catalyst | |
|---|---|---|
|  | A | A1 (according to the invention) |
| Conversion % mol. | | |
| Mono-olefins | 0 | 0 |
| Butadiene | 1 | 1 |
| Acetylenics | 98.0 | 98.0 |

It will be observed that the catalyst A1 of the invention is just as active and just as selective as the catalyst A.

EXAMPLE 2

In a first test, a catalyst is prepared by impregnating, by a nitric acid solution of palladium nitrate, an alumina support in the form of balls 2 mm in diameter having a specific surface equal to 57 m$^2$/g and of a total porous volume equal to 0.6 cm$^3$/g, so as to obtain on the finished catalyst a content of 0.3 weight % of palladium. After impregnation, the catalyst is dried at 120° C. in a stove and then calcined at 900° C. for two hours in a current of air.

A sample of the catalyst is reduced by passage through hydrogen at 100° C. over two hours; it is then examined by electron microscopy. The mean size of the crystallites of palladium is 80 Å. The catalyst is charged to a tubular reactor and reduced in situ by passing hydrogen at 100° C. over two hours.

Operation is under the following conditions:
space velocity (VVH liquid) = 20
pressure = 20 bars
temperature = 20° C.
H$_2$/(propyne + propadiene) = 1.2 mole/mole.

The analyses of the charge and the product obtained are set out in the following table:

| Compound | Charge Weight % | Product Weight % |
|---|---|---|
| Propane | 4.0 | 6.2 |
| Propylene | 91.5 | 93.65 |
| Propyne | 2.7 | undetectable |
| Propadiene | 1.8 | about 8 ppm |
| Oligomers | — | 0.15 |
| Total | 100 | 100 |

In a second test, operation is as in the first test. However, the catalyst is not reduced with hydrogen at 100° C. over two hours; in this case the catalyst is reduced in accordance with the invention in the following fashion:

The catalyst is treated with an aqueous solution of propionic acid, impregnation is effected at 20° C. under atmospheric pressure in a manner such that a catalyst contains 2 weight % of propionic acid. The temperature of the catalyst is raised to 130° C. under a pressure of 3.5 bars and these operating conditions are maintained over two hours. Then the catalyst is dried and used as in the first test.

The product obtained has the following composition:

|  | weight % |
|---|---|
| propane | 6.2 |
| propylene | 93.65 |
| propyne | undetectable |
| propadiene | about 8 ppm |

| | weight % |
|---|---|
| oligomers | 0.15 |
| Total | 100 |

The same results are observed as with the catalyst reduced conventionally with hydrogen.

EXAMPLE 3

In a first test catalyst is prepared by impregnating, with a nitric acid solution of palladium nitrate and silver nitrate, an alumina support in the form of balls 2 mm in diameter of a specific surface equal to 10 m$^2$/g and of a total porous volume equal to 96 cm$^3$/g, in a manner such as to obtain on the finished catalyst a content of 0.3 weight % of palladium and 0.3% of silver. After impregnation, the catalyst is dried at 120° C. in a stove and then calcined at 450° C. over two hours in a current of air. The catalyst is placed in a tubular reactor and reduced in situ by passing hydrogen at 100° C. over two hours.

The following operational conditions are follows:
space velocity (VVH liquid)=30
pressure=10 bars
temperature=40° C.
H$_2$/butadiene=1.8 mole/mole.

The analyses of the charge and the product obtained are set out in the following table:

| Compound | Product Weight % |
|---|---|
| 1-Butene | 27.24 |
| cis-2-Butene | 8.24 |
| trans-2-Butene | 13.42 |
| Butadiene | ≦10 ppm |
| Isobutene | 44.2 |
| Butane | 5.4 |
| Isobutane | 1.5 |
| Polymers | ≦20 ppm |

The yield by weight of product is substantially equal to 100%. It should be noted here that there is an excellent selectivity of the catalyst since 1-butene is present in the product in an amount almost equivalent to that of the charge (27.24% as against 28%). The yield in 1-butene is 27.24/28, i.e. 97.3%.

In a second test, operation is as in the first test. However, the catalyst is not reduced with hydrogen at 100° C. over two hours; here the catalyst is reduced in accordance with the invention in the following manner: The catalyst is treated with an aqueous solution of formic acid; impregnation is effected at 20° C. under atmospheric pressure in a manner such that the catalyst contains 2 weight % of formic acid. The temperature of the catalyst is raised to 130° C. under a pressure of 3.5 bars and these operating conditions are maintained over two hours. Then the catalyst is dried and used as for the first test. Exactly the same results are obtained as those in the table above.

EXAMPLE 4

The charge treated is provided by steam-cracking of gas oil and has the following characteristics:

| Characteristics | Method | Result |
|---|---|---|
| Mass per unit volume at 15° C. | NF T 60-101 | 0.859 |
| Distillation temperature ASTM °C. | NF M 07-002 | |
| Initial | | 55 |
| 50% | | 111 |
| Final | | 180 |
| Total sulfur (ppm by weight) | NF M 07-014 | 1500 |
| Sulfur H$_2$S (ppm by weight) | | <2 |
| Sulfur as thiol (ppm by weight) | NF M 07-031 | 70 |
| Corrosion of copper foil | NF M 07-015 | 1b |
| Test on plumbite (Docteur Test) | NF M 07-005 | positive |
| Bromine index (g Br/100 g) | NF M 07-017 | 52 |
| Maleic anhydride index (MAV) | | |
| mg of maleic anhydride/g | UOP 326-58 | 97 |
| Period of induction with 20 ppm by weight of antioxidant (N,N'-di-sec-Butyl-paraphenylene diamine) | | |
| Research octane number (0.05% by weight of tetraethyl lead) | NF M 07-012 | 98 |

This oil, mixed with hydrogen, is passed through a reactor containing exclusively a catalyst containing 10% of nickel deposited in conventional manner in the form of nickel nitrate on an alumina support having a specific surface of 70 m$^2$/g. Before use, the catalyst is calcined at 450° C. over two hours and then reduced with hydrogen at 400° C. over fifteen hours.

The operating conditions are as follows:
space velocity vol/vol/hour=2
mean temperature °C.=130
total pressure (bars)=40
H$_2$/charge (moles)=0.5

The product obtained after one hundred hours of operation has the following principal characteristics:

| | |
|---|---|
| Bromine index g/100 g: | 43 |
| MAV mg/g (maleic anhydride index): | 10 |
| Induction period in minutes with 20 ppm by weight of antioxydant: | 480 |
| Thiol sulfur (ppm by weight): | 6 |
| Total sulfur (ppm by weight): | 1,500 |
| Corrosion of copper foil: | 1a |
| Plumbite test: | negative |
| Research octane number: | 98 |

It will be observed that the product is purified by comparison with the charge and corresponds well with the specifications required for conventional motor-car fuels.

In another method, operation is as with the preceding catalyst. However, the catalyst is not reduced with hydrogen at 400° C. over fifteen hours, in this case the catalyst is reduced in accordance with the invention in the following manner:

The catalyst is treated with an aqueous solution of propionic acid; impregnation is effected at 20° C. under atmospheric pressure in a manner such that the catalyst contains 2% by weight of propionic acid. The temperature of the catalyst is raised to 130° C. under a pressure of 3.5 bars and these operating conditions are maintained for two hours. Then the catalyst is dried and used as above. The same results are obtained as those indicated above.

I claim:

1. A process for selective hydrogenation of a feed, comprising subjecting said feed to hydrogenation conditions in the presence of a catalyst, wherein said catalyst contains a support and an active phase based on at least one metal of group VIII of the periodic classification elements, and wherein before the catalyst is used, a treatment of said catalyst is carried out comprising in the absence of hydrogen and carbon monoxide:
   (a) impregnating the catalyst at between 0° and 50° C. with an aqueous or organic solution of a compound that is a reducing agent selected from the group consisting of aldehydes having 2 to 14 carbon atoms, ketones having 3–18 carbon atoms, polyketones having 3 to 18 carbon atoms, ethers having 2 to 14 carbon atoms, alcohols having 1 to 14 carbon atoms, polyalcohols having 1 to 14 carbon atoms, organic acids having 1 to 14 carbon atoms, polyacids having 1 to 14 carbon atoms and mixtures thereof, in a manner so as to introduce from 10 ppm to 100% (by weight) of said compound onto the catalyst;
   (b) raising the temperature of the thus impregnated catalyst to a temperature between 100° and 150° C. and under a pressure of 1 to 10 bars, thereby reducing the catalyst; and
   (c) drying the catalyst to eliminate aqueous or organic solution.

2. A process according to claim 1 in which, in step (a), the impregnation temperature of the reducing compound is between 10° and 30° C.

3. A process according to claim 1 in which, in step (a), 10 ppm to 50% by weight of the said reducing compound is introduced onto the catalyst.

4. A process according to claim 1 in which the metal of group VIII is chosen from the group consisting of iron, cobalt and nickel.

5. A process according to claim 1 in which the metal of group VIII is selected from the group consisting of platinum, palladium, iridium, ruthenium, rhodium and osmium.

6. A process according to claim 1 in which the operation is ex situ, i.e. outside the refining reaction zone.

7. A process according to claim 1 in which the reducing agent is an aldehyde.

8. A process according to claim 1 in which the reducing agent is a ketone or a polyketone.

9. A process according to claim 1 in which the reducing agent is an ether.

10. A process according to claim 1 in which the reducing agent is an alcohol or a polyalcohol.

11. A process according to claim 1 in which the reducing agent is an organic acid or an organic polyacid.

12. A process according to claim 1, in which in the treatment of the catalyst, the catalyst is situated in an enclosure and the temperature sufficient to crack or decompose the reducing compound is obtained by circulation in the said enclosure of a current of dry steam or at least one other inert fluid.

13. A process according to any one of claim 12 in which the said enclosure containing the bed of the catalyst is equipped with hollow tubes through which a fluid passes whereby the necessary temperature regulation of the said process is obtained.

14. A process according to claim 13 in which the said enclosure is a rotary furnace arranged in such a manner that during rotation the catalyst particles are brought regularly into contact with the heating tubes.

15. A process according to claim 1 in which the catalyst contains inter alia a metal of group Ib selected from the group consisting of silver, gold and copper.

16. A process in accordance with the process of claim 1, comprising a selective hydrogenation reaction of an unsaturated hydrocarbon.

17. A process according to claim 1, wherein the feed comprises at least one acetylenic and/or diolefinic hydrocarbon.

18. A process according to claim 1, wherein the feed comprises at least one oil.

19. A process according to claim 1, wherein the feed comprises at least one oil containing a gum-forming compound.

20. A process according to claim 1, wherein the feed comprises at least one pyrolysis effluent.

21. A process for selective cracking of a feed, comprising subjecting said feed to cracking conditions in the presence of a catalyst, wherein said catalyst contains a support and an active phase based on at least one metal of group VIII of the periodic classification elements, and wherein before the catalyst is used, a treatment of said catalyst is carried out comprising in the absence of hydrogen and carbon monoxide:
   (a) impregnating the catalyst at between 0° and 50° C. with an aqueous or organic solution of a compound that is a reducing agent selected from the group consisting of aldehydes having 2 to 14 carbon atoms, ketones having 3–18 carbon atoms, polyketones having 3 to 18 carbon atoms, ethers having 2 to 14 carbon atoms, alcohols having 1 to 14 carbon atoms, polyalcohols having 1 to 14 carbon atoms, organic acids having 1 to 14 carbon atoms, polyacids having 1 to 14 carbon atoms and mixtures thereof, in a manner so as to introduce from 10 ppm to 100% (by weight) of said compound onto the catalyst;
   (b) raising the temperature of the thus impregnated catalyst to a temperature between 100° and 150° C. and under a pressure of 1 to 10 bars, thereby reducing the catalyst; and
   (c) drying the catalyst to eliminate aqueous or organic solution.

22. A process according to claim 21, wherein the cracking reaction is a steam-cracking process.

* * * * *